(12) United States Patent
Long

(10) Patent No.: US 10,686,778 B2
(45) Date of Patent: Jun. 16, 2020

(54) ACCOUNT LOGIN METHOD AND APPARATUS

(71) Applicant: TENCENT TECHNOLOGY (SHENZHEN) COMPANY LIMITED, Shenzhen (CN)

(72) Inventor: Fucheng Long, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 84 days.

(21) Appl. No.: 15/974,395

(22) Filed: May 8, 2018

(65) Prior Publication Data

US 2018/0255051 A1 Sep. 6, 2018

Related U.S. Application Data

(63) Continuation of application No. PCT/CN2017/084099, filed on May 12, 2017.

(30) Foreign Application Priority Data

May 12, 2016 (CN) ............ 2016 1 0316194

(51) Int. Cl.
*G06F 21/00* (2013.01)
*H04L 29/06* (2006.01)
(Continued)

(52) U.S. Cl.
CPC ...... *H04L 63/0815* (2013.01); *G06F 9/45529* (2013.01); *G06F 11/30* (2013.01);
(Continued)

(58) Field of Classification Search
CPC ... H04L 63/0815; H04L 63/083; H04L 67/10; H04L 63/102; H04L 63/08
See application file for complete search history.

(56) References Cited

U.S. PATENT DOCUMENTS

| 6,826,696 B1 | 11/2004 | Chawla et al. |
| 2011/0154464 A1* | 6/2011 | Agarwal ............ H04L 63/0815 726/8 |

(Continued)

FOREIGN PATENT DOCUMENTS

| CN | 103856446 A | 6/2014 |
| CN | 104038503 A | 9/2014 |

(Continued)

OTHER PUBLICATIONS

International Search Report dated Jul. 28, 2017 in PCT/CN2017/084099, with English translation, citing documents AA and AO-AR therein, 5 pages.

*Primary Examiner* — Ghazal B Shehni

(74) *Attorney, Agent, or Firm* — Oblon, McClelland, Maier & Neustadt, L.L.P.

(57) ABSTRACT

A method is provided in which a JavaScript (JS) SDK file is called by an application. A plurality of login paths for logging in to the application is encapsulated in the JS SDK file. When the application is started, a running environment of the application is detected by using the JS SDK file. A login path supported by the running environment is determined by using the JS SDK file. Further, a first login path is sent to the application by using the JS SDK file. The first login path is the login path supported by the running environment and is one of the plurality of login paths.

17 Claims, 7 Drawing Sheets

(51) Int. Cl.
- *G06F 21/12* (2013.01)
- *G06F 11/30* (2006.01)
- *H04W 12/06* (2009.01)
- *G06F 9/455* (2018.01)
- *G06F 21/41* (2013.01)
- *H04L 29/08* (2006.01)
- *H04L 12/58* (2006.01)

(52) U.S. Cl.
CPC ............ *G06F 21/12* (2013.01); *G06F 21/128* (2013.01); *G06F 21/41* (2013.01); *H04L 67/20* (2013.01); *H04W 12/06* (2013.01); *H04L 51/046* (2013.01); *H04L 63/083* (2013.01)

(56) References Cited

U.S. PATENT DOCUMENTS

2013/0305392 A1* 11/2013 Bar-El ...................... H04L 9/08
    726/29
2015/0264038 A1    9/2015  Cao et al.

FOREIGN PATENT DOCUMENTS

| CN | 104580406 A | 4/2015 |
| CN | 105791324 A | 7/2016 |

* cited by examiner

| Penguin login | × |

| Account | Abcd |

| Password | ... |

[✓] Automatic login next time    Meet difficulties when log in

Log in

Register immediately

FIG. 4

ACCOUNT LOGIN METHOD AND APPARATUS

RELATED APPLICATION

This application is a continuation of International Application No. PCT/CN2017/084099, filed on May 12, 2017, which claims priority to Chinese Patent Application No. 201610316194.5, entitled "ACCOUNT LOGIN METHOD AND APPARATUS" filed with the Chinese Patent Office on May 12, 2016. The entire disclosures of the prior applications are hereby incorporated by reference in their entirety.

FIELD OF THE TECHNOLOGY

This application relates to the field of Internet technologies.

BACKGROUND OF THE DISCLOSURE

QQ interconnection, WeChat login, and Microblog login on a web are implemented based on the OAuth2.0 open standard. The OAuth2.0 is an open standard that allows a user to use a third-party application to access a private resource (for example, a photo, a video, or a contact list) stored by the user on a website, without providing a user name or a password to the third-party application. A developer of the third-party application needs to provide, when QQ login, WeChat login, and Microblog login performed in html5 need to be supported, an interface for each of the QQ login, the WeChat login, and the Microblog login, for example, to introduce a QQ SDK file for the QQ login. However, a plurality of interfaces needs to be provided when the method of performing login in using a plurality of manners is used. In addition, an access process is relatively complex, and it is easy to cause an access error. For the foregoing problem, no effective solution has been put forward currently.

SUMMARY

Embodiments of this application provide an account login method and apparatus, to resolve a technical problem that when interfaces are provided in a plurality of login methods, an access process is complex and is error-prone.

According to an aspect of the embodiments of this application, a method is provided. A JavaScript (JS) SDK file is called by an application. A plurality of login paths for logging in to the application is encapsulated in the JS SDK file. When the application is started, a running environment of the application is detected by using the JS SDK file. A login path supported by the running environment is determined by using the JS SDK file. Further, a first login path is sent to the application by using the JS SDK file. The first login path is the login path supported by the running environment and is one of the plurality of login paths.

According to another aspect of the embodiments of this application, an information processing apparatus is provided. The information processing apparatus includes processing circuitry that calls a JavaScript (JS) SDK file by an application. A plurality of login paths for logging in to the application is encapsulated in the JS SDK file. When the application is started, the processing circuitry detects a running environment of the application by using the JS SDK file. The processing circuitry determines a login path supported by the running environment by using the JS SDK file. Further, the processing circuitry sends a first login path to the application by using the JS SDK file. The first login path is the login path supported by the running environment and is one of the plurality of login paths.

According to another aspect of the embodiments of this application, a non-transitory computer-readable medium is provided. The non-transitory computer-readable medium stores a program executable by a processor to perform calling a JavaScript (JS) SDK file by an application. A plurality of login paths for logging in to the application is encapsulated in the JS SDK file. When the application is started, a running environment of the application is detected by using the JS SDK file. A login path supported by the running environment is determined by using the JS SDK file. Further, a first login path is sent to the application by using the JS SDK file. The first login path is the login path supported by the running environment and is one of the plurality of login paths.

In the embodiments of this application, in this embodiment, the plurality of login paths is encapsulated in the JS SDK file, and login by using a plurality of login paths may be implemented by providing an interface for the JS SDK file by the application, so that the technical problem that in the related technology, when interfaces are provided in a plurality of login manners for the application, an access process is complex and is error-prone is resolved, and a technical effect of simplifying an access program is reached. In addition, the running environment of the application may be detected by using the JS SDK file, and a login path suitable for the current running environment is selected according to the running environment for the application, so that the compatibility of the JS SDK file is improved. When a login path is selected, a login path incompatible with a current running environment may be avoided, so that a selected first login path is compatible with a running environment of an application. This also simplifies a technical problem that in the related technology, the development costs are high due to compatibility adaptation performed for satisfying the compatibility of different running environments.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the figures:

FIG. 4 is a schematic diagram of a login page associated with a first login path according to an embodiment of this application;

DESCRIPTION OF EMBODIMENTS

To make a person skilled in the art understand the solutions in this application better, the following clearly describes the technical solutions in the embodiments of this application with reference to the accompanying drawings in the embodiments of this application. The described embodiments are merely some but not all of the embodiments of this application. All other embodiments obtained by a person of ordinary skill in the art based on the embodiments of this application shall fall within the protection scope of this application.

It should be noted that, in the specification, claims, and accompanying drawings of this application, the terms "first", "second", and so on are intended to distinguish between similar objects rather than describe a specific order. It should be understood that, data used in this way is exchangeable in a proper case, so that the embodiments described herein of this application can be implemented in another order except those shown or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Explanations of Terminologies:

JS SDK: JavaScript Software Development Kit, applicable to a development tool package of JavaScript language, and a development framework.

Option: A parameter when an Application Programming Interface (API) is called.

Callback: A callback function after the call of the API is completed.

Embodiment 1

According to this embodiment of this application, a method embodiment that may be performed by using an apparatus embodiment of this application is provided. It should be noted that, steps shown in flowcharts of the accompanying drawings may be performed in a computer system in a form such as a group of computer executable instructions. In addition, although a logical sequence is shown in the flowcharts, in some cases, the shown or described steps may be performed in different sequences.

According to this embodiment of this application, an account login method is provided.

Figure 1:
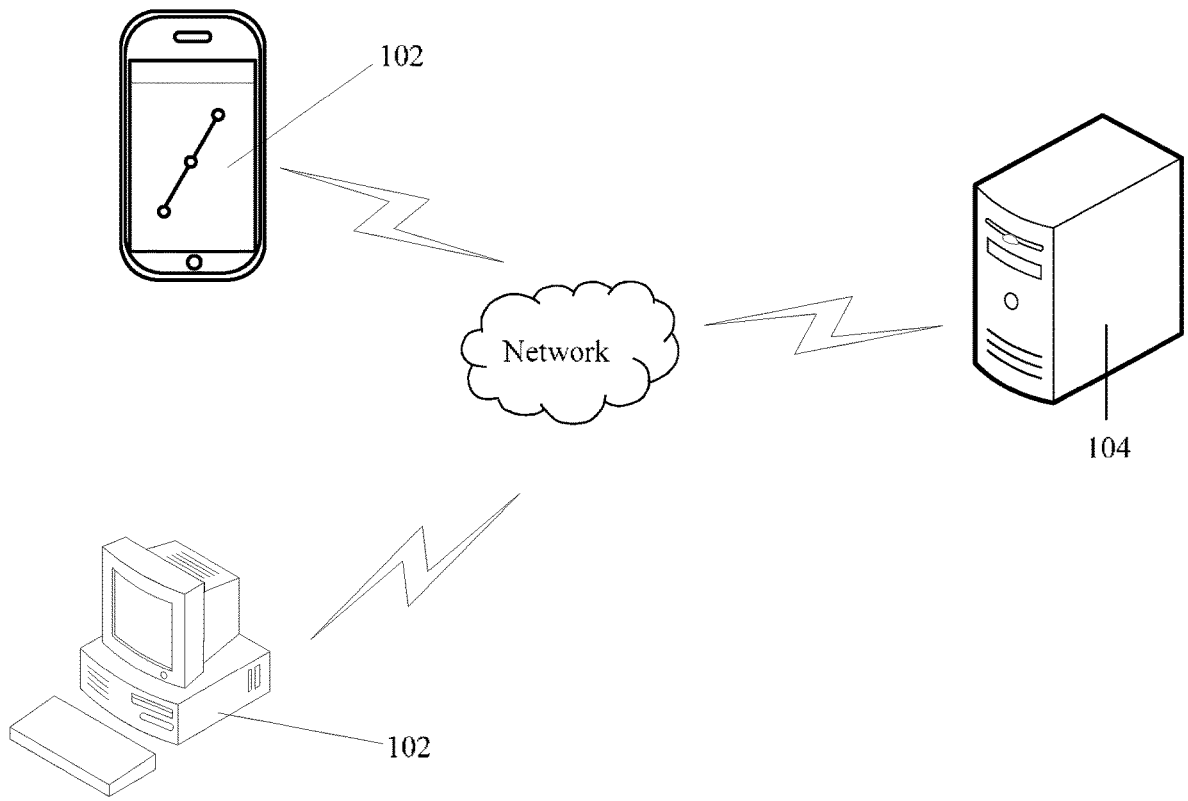
FIG. 1 is an architectural diagram of a hardware environment according to an embodiment of this application.

Optionally, in this embodiment, the foregoing account login method may be applied to a hardware environment formed by a terminal 102 and a server 104 shown in FIG. 1. As shown in FIG. 1, the terminal 102 is connected to the server 104 by using a network. The network includes but is not limited to: a mobile communications network, a wide area network, a metropolitan area network, or a local area network. The terminal 102 may be a mobile phone terminal, or may be a personal computer (PC) terminal, a laptop terminal, or a tablet computer terminal.

Figure 2:
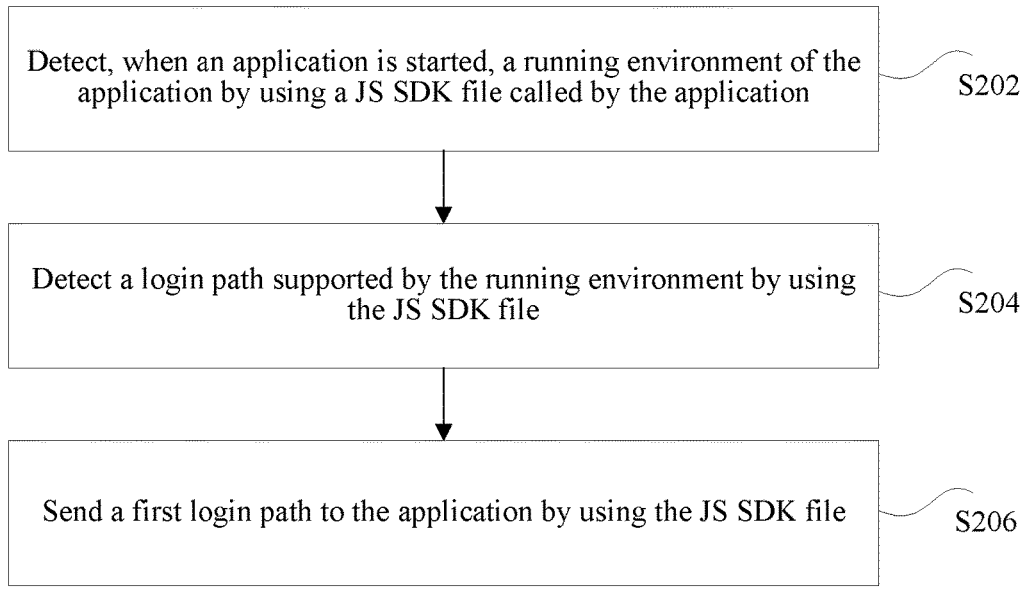
FIG. 2 is a flowchart of an account login method according to an embodiment of this application.

FIG. 2 is a flowchart of an account login method according to an embodiment of this application. As shown in the FIG. 2, the method includes the following steps:

In step S202, detect, when an application is started, a running environment of the application by using a JS SDK file called by the application, a plurality of login paths for logging in to the application being encapsulated in the JS SDK file.

In step S204, detect, by using the JS SDK file, a login path supported by the running environment.

In step S206, send a first login path to the application by using the JS SDK file, the first login path being the login path supported by the running environment, and the first login path being at least one of the plurality of login paths.

In this embodiment, the plurality of login paths is encapsulated in the JS SDK file, and login by using a plurality of login paths may be implemented by providing an interface for the JS SDK file by the application, so that the technical problem that in the related technology, when interfaces are provided in a plurality of login manners for the application, an access process is complex and is error-prone is resolved, and a technical effect of simplifying an access program is reached. In addition, the running environment of the application may be detected by using the JS SDK file, and a login path suitable for the current running environment is selected according to the running environment for the application, so that the compatibility of the JS SDK file is improved. When a login path is selected, a login path incompatible with a current running environment may be avoided, so that a selected first login path is compatible with a running environment of an application. This also simplifies a technical problem that in the related technology, the development costs are high due to compatibility adaptation performed for satisfying the compatibility of different running environments.

In some examples, the foregoing plurality of login paths includes a WeChat login path, a QQ login path, a Microblog login path, another website login path, and the like. The running environment includes a browser, a mobile instant messaging client, an information publishing platform, an instant messaging client, and the like. A JS SDK obtains different running environments by determining window user Agent information in a current environment. However, not all running environments can be logged in to by using a plurality of login paths. For example, an application runs in WeChat and a browser supports WeChat login. In an example, an application supports both QQ and Microblog login in another web environment. In view of this, a plurality of login paths is encapsulated in a JS SDK file, and when one or more login paths are supported by a detected running environment, the supported one or more login paths are sent to an application, so that the application displays one or more identifiers of the respective one or more login paths.

That an application is a game A is used as an example. The game A may run in an instant messaging client such as a browser, social space, WeChat, or QQ.

A JS SDK file is configured in the game A in advance, and the JS SDK file is called first when the game A is loaded. A running environment of the game A is detected by using the JS SDK file, and a login path supported by the running environment is determined. If it is detected that the running environment of the game A is WeChat, and if it is determined that the login path supported by the WeChat environment is WeChat login (that is, a first login path), the login path of WeChat login is sent to the game A by using the JS SDK file. If it is determined that a login path supported by the WeChat environment further includes Microblog login, a login path of Microblog login is also sent to the game A by using the JS SDK file.

After the game A obtains the Microblog login path and the WeChat login path, identifiers of the two login paths are displayed on an interface of the game A, to prompt a user that login may be performed in the two manners. If the user selects the WeChat login, authorization information of WeChat is obtained by using the JS SDK file, the game A is logged in to by using a WeChat account and a password, and the game A is allowed to access resources (for example, a photo, a nickname, a portrait, a video, or the like) that are associated with the WeChat account, while the WeChat account and the password are not provided to the game A.

Optionally, when login is performed by using a login account and a password of another application, an interface of a current application jumps to a login interface of the another application, and the interface of the current application jumps back after the login account and the password are submitted. Consequently, a callback function is lost due to a plurality of times of jump, and login information cannot be returned to the current application. Therefore, in this embodiment of this application, the callback function is injected when a page jumps back to the interface of the current application. That is, after the sending a first login path to the application by using the JS SDK file, the method further includes: injecting, when the application jumps from a first page to a second page and loads the second page, a callback function to the second page by using the JS SDK file, the callback function being used for calling login information about a login using the first login path back into the application, the first page being a login page associated with the first login path, and the second page being a page to which the application returns after the login using the first login path.

Figure 3:
FIG. 3 is a schematic diagram of a login page of a game according to an embodiment of this application.

The example of the game A is continued. An identifier of a QQ login path shown in FIG. 3 is displayed on the interface of the game A interface. After it is detected that the identifier receives a click action, a first page shown in FIG. 4 is jumped to. After a login account and a password are submitted on the first page, the first page is jumped to a second page shown in FIG. 5. The second page has a same domain name as that of a page shown in FIG. 3. The page shown in FIG. 3 is a page before the login, and the second page is a page after the login. In a process of jumping from the first page to the second page, when the second page is loaded, a callback function is injected to the second page by using the JS SDK file, so that a callback function lost in a jumping process is supplemented. After the login succeeds, the login information is transferred back by using a URL parameter of the second page. Therefore, the callback function in the second page may return the login information to the game A.

Further, after the injecting a callback function to the second page by using the JS SDK file, the method further includes: obtaining a URL of the second page by using the JS SDK file and parsing out the login information carried in the URL of the second page, when the application jumps from the first page to the second page; and sending the parsed-out login information to the callback function by using the JS SDK file, so that the callback function calls the login information back into the application.

When the application jumps from the first page to the second page, whether the URL parameter of the second page includes a parameter of the successful login is determined by using the JS SDK file, and if yes, the login information is parsed out from the URL of the second page, the callback function is called, and the login information is sent to the callback function, so that the callback function calls the login information back into the application.

Figure 5:
FIG. 5 is a schematic diagram of a front page of a game after successful login according to an embodiment of this application.

For example, when the game A displays the second page shown in FIG. 5, the login information is parsed out from the URL of the second page by using the JS SDK file, the callback function is called, and the login information is sent to the callback function, so that the callback function calls the login information back into the application. The callback function may call the login information, a login result, and the like back into the game A. The call-back content may be read and used by a developer, and facilitate development performed by the developer.

Optionally, the sending a first login path to the application by using the JS SDK file includes: providing an API to the application by using the JS SDK file, the API providing a channel for calling the JS SDK file to the application; and sending the first login path to the application through the channel by using the JS SDK file.

The JS SDK file may provide an API getAvailableLoginType (option, callback), and the first login path in the JS SDK file may be sent to the application by using this interface. The application may jump to the first page associated with the first login path, to complete login. In this way, the plurality of login paths in the JS SDK file may be called by using a manner in which an interface is established between the application the JS SDK file, and the application performs calling by using an interface, and a calling manner of setting a plurality of interfaces and a plurality of interfaces is not needed, so that a calling program is simplified, a problem such as a calling error of a plurality of interfaces is avoided, and the system reliability is improved.

Optionally, the sending a first login path to the application by using the JS SDK file includes: searching the plurality of login paths for a path matching the running environment by using the JS SDK file; using the path matching the running environment as the first login path by using the JS SDK file; and sending information about the first login path to the application by using the JS SDK file.

The JS SDK file may determine a login path supported by a respective running environment, and therefore, one or more paths used in the detected running environment can be selected from the plurality of login paths according to the detected running environment. The matching process may use, for example, a form of a table, to record a correspondence between the running environment and the login path, and search, according to the correspondence, a login path that corresponds to a current running environment. Other matching manners may also be applied to this embodiment, and are not listed one by one herein.

Optionally, after the sending a first login path to the application by using the JS SDK file, the method further includes: displaying, by the application, a login identifier associated with the first login path, the login identifier being used for receiving a login indication and connecting to a first page associated with the first login path after the login indication is received.

For the application, after receiving the first login path indicated by the JS SDK file, if the first login path indicates QQ login, the application displays a QQ login identifier; or if the first login path indicates WeChat login, the application displays a WeChat login identifier. If both the two login paths may be used in the current running environment, the login identifiers are simultaneously displayed. The user may select a login path according to the login identifier. If the user selects the QQ login identifier, the page jumps to a QQ login page; or if the user selects the WeChat login identifier, the page jumps to a WeChat login page. Other login manners are the same as this, and are not listed herein.

In this embodiment, the first login path may be a website of the first page, and an account text box, a password input text box, a "submission" identifier, or the like may be displayed in the first page. For example, if the first login path is WeChat login, the first page is a page provided by WeChat; or if the first login path is Microblog login, the first page is a page provided by Microblog. That is, a form of the first page may not be performed by the application, but when the application receives the first login path and displays the login identifier that is associated with the first login path, the form of the login identifier may be determined by the application.

Optionally, the detecting, when an application is started, a running environment of the application by using a JS SDK file called by the application includes: determining, by using the JS SDK file, whether an SDK file of a terminal on which the application runs provides any one or more of the plurality of login paths; and if it is determined that the SDK file of the terminal provides any one or more of the plurality of login paths, accessing, in bridged mode, an API of the terminal by using the JS SDK file to call the SDK file of the terminal, so that the any one or more login paths are sent to the application by using the SDK file of the terminal.

Login paths are also stored in SDK files of some terminal. If a login path stored in an SDK file in a terminal may be called in the running environment of the application, login may be performed by directly using the login path in the SDK file in the terminal, and the JS SDK file works as a bridge, so that a procedure of the JS SDK file may be simplified, a logic is simplified by using the login path provided in the SDK file in the terminal, and the login efficiency is improved. In an embodiment, if it is detected by using the JS SDK file that a terminal SDK supports QQ login and WeChat login, the JS SDK file may directly access, in bridged mode, an API of the terminal, so that interaction between a service logic of the terminal and the application, and interaction between the terminal and a WeChat server or a QQ server are implemented.

The application in this embodiment may be a web application or another terminal application. The examples of QQ and WeChat that are used in this embodiment may be replaced with other social software, financial management software, game software, office software, and the like, and are not described one by one herein again.

Figure 6:
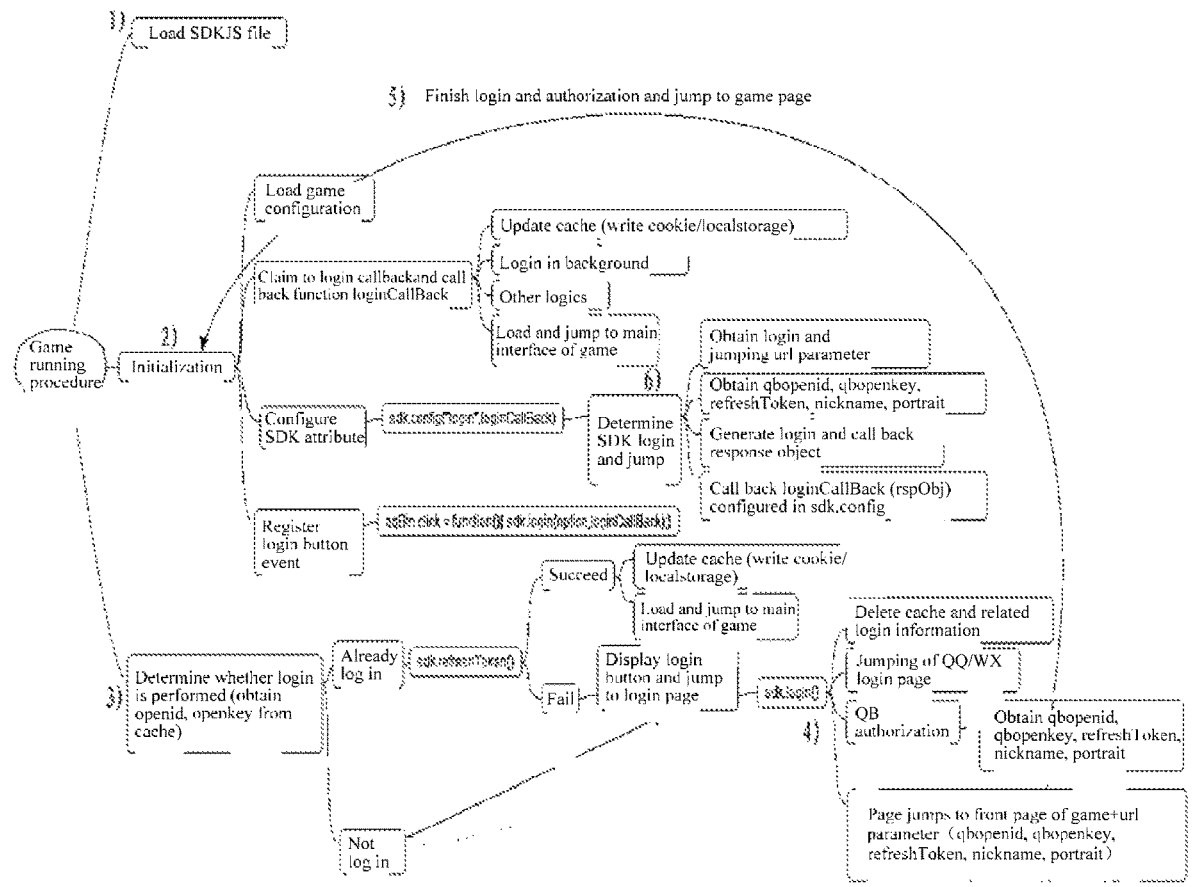
FIG. 6 is a flowchart of an account login method in a game according to an embodiment of this application.

The following describes this embodiment by using FIG. 6 as an example.

1) html5 first loads a JS SDK file in a running process of a game.

2) Initialization is performed, game configuration is loaded, a callback function is claimed to be logged in to, and an SDK attribute is configured and a login button event is registered. The callback function claimed in this case may be lost in a jumping process.

3) Whether login is performed is determined, that is, whether a current game is logged in to is determined. If the login is performed, whether login information of the login is effective is determined, and if yes, cache is update, and a main interface of the game is loaded/jumped to; or if no, a login button is displayed/a login page (a first page) is jumped to; or if the login does not perform, a login button is displayed/a login page is jumped to.

4) After the login succeeds, login information related to the cache is cleaned, login page jump is performed, authorization is requested from a server, a nickname, a portrait, and the like of the account that are used for performing the login are obtained, the page jumps to a front page of the game, and brings back a URL parameter (the parameter includes the nickname and the portrait).

5) In a process of jumping back to the front page of the game, the callback function is injected to the front page of the game.

6) The URL parameter that is of the jumped front page of the game is obtained by using the JS SDK file, and the nickname and the portrait are parsed out, to generate a corresponding login parameter of the login and calling back, and the login parameter is sent to the callback function, to call back a login parameter configured in JS SDK config.

Figure 7:
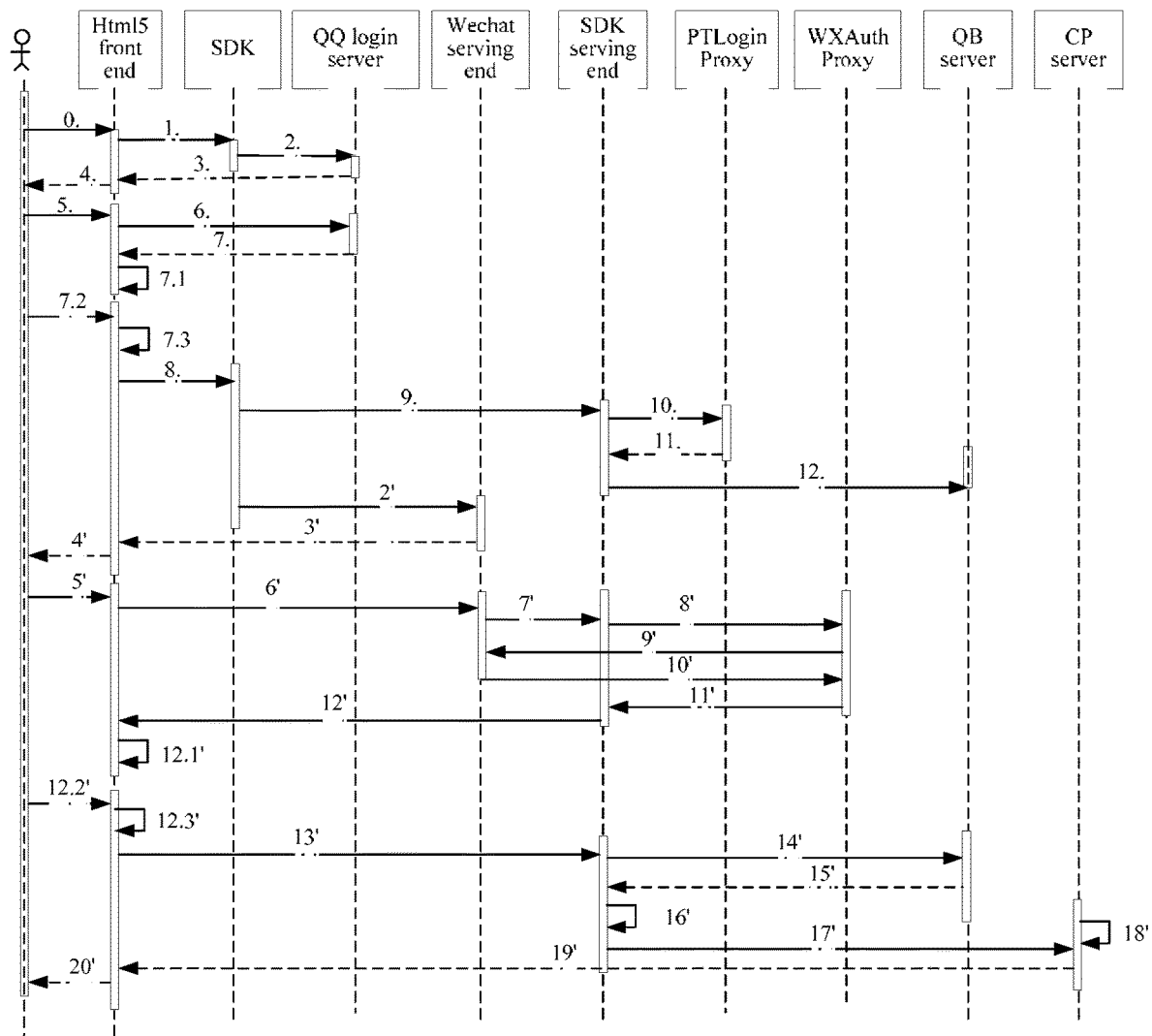
FIG. 7 is an interaction diagram of an account login method according to an embodiment of this application.

The following describes this embodiment by using FIG. 7 as an example.

(1) QQ login is used.

0. A user logs in to a front end of html5.

1. A JS SDK is loaded.

2. Top windows save a login callback function, and a login page of jumping is displayed.

3. QQ login server returns the login page to html5.

4. html5 displays the login page.

5. html5 is instructed to use QQ login.

6. html5 submits the login to the QQ login server.

7. The QQ login server writes a cookie for html5, and jumps to a QB authorization page.

7.1 html5 determines whether authorization is performed before, and if yes, jumps to a login success page; or if no, displays an authorization item.

7.2. The user sends an indication to html5 of agreeing to authorize.

7.3. html5 jumps and logs in to an authorization success page.

8. html5 requests a QBopenID.

9. The SDK sends a QBopenID request to a SDK service end (or a SDK serving end).

10. The SDK service end requests PTloginProxy to perform login authentication.

11. PTloginProxy login proxy returns an authentication result to the SDK service end.

12. The SDK service end requests QBID from a QB server.

(2) WeChat login is used.

1'. A JS SDK is loaded the same as the QQ login in 1.

2'. A terminal JS SDK pulls up WeChat login/or jumps to a WeChat quick response code authorization page, and a user manually starts WeChat login and scans the code.

3'. The WeChat service end (or WeChat serving end) returns a WeChat authorization interface to html5.

4'. html5 displays the WeChat authorization interface.

5'. html5 receives WeChat authorization of the user.

6'. html5 submits the authorization to the WeChat service end.

7'. The WeChat service end sends the callback function to the SDK serving end.

8'. The SDK service end requests the authorization from WXAuthProxy.

9'. WXAuthProxy requests the authorization from the WeChat service end.

10'. WeChat service end returns OpenID.Access Token to WXAuthProxy.

11'. WXAuthProxy returns OpenID.Access Token to the SDK service end.

12'. The SDK service end sends a jump QB authorization page to html5.

12.1' It is determined whether authorization is performed before, and if yes, a login success page is jumped to; or if no, an authorization item is displayed.

12.2'. The user sends an indication to html5 of agreeing to authorize.

12.3'. html5 jumps and logs in to an authorization success page.

13'. html5 sends a QBOpenID request to the SDK service end.

14. The SDK service end sends the QBID request to a QB server.

15'. The QB server returns QBID to the SDK service end.

16'. The SDK service end obtains login information such as a nickname.

17'. Signature the URL and jump to a CP page by using 302 redirection, and it is not easy for a result returned by using the 302 jumping to be tampered with.

18'. A CP server checks data and stores parameter information to DB, and returns the signatures of the a plurality of interfaces.

19'. The jumped page executes iframe and calls back/stores the login information to cookie/local storage.

20. html5 displays that the login succeeds.

Other login manners are similar to the foregoing QQ account login manner, and details are not described herein again.

It should be noted that, to simplify the description, the foregoing method embodiments are described as a series of action combination. But a person of ordinary skill in the art should know that this application is not limited to any described sequence of the action, as some steps can adopt other sequences or can be performed simultaneously according to this application. Secondarily, a person skilled in the art should know that the embodiments described in the specification belong to exemplary embodiments and the involved actions and modules are not necessary for this application.

Through the descriptions of the preceding embodiments, a person skilled in the art may understand that the methods according to the foregoing embodiments may be implemented by software plus a suitable hardware platform, and may be implemented by hardware. Based on such an understanding, the technical solutions of this application may be embodied in the form of a software product. The computer software product is stored in a storage medium (for example, a ROM/RAM, a magnetic disk, or an optical disc), and includes several instructions for instructing an information processing apparatus (which may be a terminal device, a mobile phone, a computer, a server, or a network device) to perform the methods according to the embodiments of this application.

Embodiment 2

According to this embodiment of this application, an account login apparatus used for implementing the foregoing account login method is further provided. The account login apparatus is mainly used to perform the account login method provided in the foregoing content of this embodiment of this application. The following describes the account login apparatus provided in this embodiment of this application.

Figure 8:
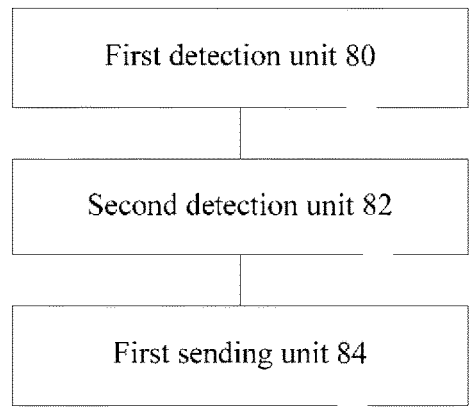
FIG. 8 is an interaction diagram of an account login apparatus according to an embodiment of this application.

FIG. 8 is a schematic diagram of the account login apparatus according to this embodiment of this application. As shown in FIG. 8, the account login apparatus mainly includes: a first detection unit 80, a second detection unit 82, and a first sending unit 84.

The first detection unit 80 is configured to detect, when an application is started, a running environment of the application by using a JS SDK file called by the application, a plurality of login paths for logging in to the application being encapsulated in the JS SDK file.

The second detection unit 82 is configured to detect a login path supported by the running environment.

The first sending unit 84 is configured to send a first login path to the application by using the JS SDK file, the first login path being the login path supported by the running environment, and the first login path being at least one of the plurality of login paths.

In this embodiment, the plurality of login paths is encapsulated in the JS SDK file, and login by using a plurality of login paths may be implemented by providing an interface for the JS SDK file by the application, so that the technical problem that in the related technology, when interfaces are provided in a plurality of login manners for the application, an access process is complex and is error-prone is resolved, and a technical effect of simplifying an access program is reached. In addition, the running environment of the application may be detected by using the JS SDK file, and a login path suitable for the current running environment is selected according to the running environment for the application, so that the compatibility of the JS SDK file is improved. When a login path is selected, a login path incompatible with a current running environment may be avoided, so that a selected first login path is compatible with a running environment of an application. This also simplifies a technical problem that in the related technology, the development costs are high due to compatibility adaptation performed for satisfying the compatibility of different running environments.

In an embodiment, the foregoing plurality of login paths includes a WeChat login path, a QQ login path, a Microblog login path, another website login path, and the like. The running environment includes a browser, a mobile instant messaging client, an information publishing platform, an instant messaging client, and the like. However, not all running environments can be logged in to by using a plurality of login paths. For example, an application runs in WeChat and a browser supports WeChat login, while supports QQ and Microblog login in another web environment. In view of this, a plurality of login paths is encapsulated in a JS SDK file, and when one or more login paths are supported by a detected running environment, the supported one or more login paths are sent to an application, so that the application displays an identifier of the one or more login paths.

That an application is a game A is used as an example. The game A may run in an instant messaging client such as a browser, social space, WeChat, or QQ.

A JS SDK file is configured in the game A in advance, and the JS SDK file is called first when the game A is loaded. A running environment of the game A is detected by using the JS SDK file, and a login path that is supported by the running environment is determined. If it is detected that the running environment of the game A is WeChat, and if it is determined that the login path that is supported by the WeChat environment is WeChat login (that is, a first login path), the login path of WeChat login is sent to the game A by using the JS SDK file. If it is determined that a login path that is supported by the WeChat environment further includes Microblog login, a login path of Microblog login is also sent to the game A by using the JS SDK file.

After the game A obtains the Microblog login path and the WeChat login path, identifiers of the two login paths are displayed on an interface of the game A, to prompt a user that login may be performed in the two manners. If the user selects the WeChat login, authorization information of WeChat is obtained by using the JS SDK file, the game A is logged in to by using a WeChat account and a password, and the game A is allowed to access resources (for example, a photo, a nickname, a portrait, a video, or the like) that are associated with the WeChat account, while the WeChat account and the password are not provided to the game A.

Optionally, when login is performed by using a login account and a password of another application, an interface of a current application jumps to a login interface of the another application, and the interface of the current application jumps back after the login account and the password are submitted. Consequently, a callback function is lost due to the plurality of times of jump, and login information cannot be returned to the current application. Therefore, in this embodiment of this application, the callback function is injected when a page jumps back to the interface of the current application. That is, the apparatus further includes an injection unit, configured to: after the first login path is sent to the application, inject, when the application jumps from a first page to a second page and loads the second page, a callback function to the second page, the callback function being used for calling login information about a login using the first login path back into the application, the first page being a login page associated with the first login path, and the second page being a page to which the application returns after the login using the first login path.

The example of the game A is continued. An identifier of a QQ login path shown in FIG. 3 is displayed on the interface of the game A interface. After it is detected that the identifier receives a click action, a first page shown in FIG. 4 is jumped to. After a login account and a password are submitted in the first page, the first page is jumped to a second page shown in FIG. 5. The second page has a same domain name as that of a page shown in FIG. 3. The page shown in FIG. 3 is a page before the login, and the second page is a page after the login. In a process of jumping from the first page to the second page, when the second page is loaded, a callback function is injected to the second page by using the JS SDK file, so that a callback function that is lost in a jumping process is supplemented. After the login succeeds, the login information is transferred back by using a URL parameter of the second page. Therefore, the callback function in the second page may return the login information to the game A.

Further, the apparatus further includes: an obtaining unit, configured to: after the injection unit injects the callback function to the second page and when the application jumps from the first page to the second page, obtain a URL of the second page by using the JS SDK file and parse out the login information carried in the URL of the second page; and a second sending unit, configured to send the parsed-out login information to the callback function, so that the callback function calls the login information back into the application.

When the application jumps from the first page to the second page, whether the URL parameter of the second page includes a parameter of the successful login is determined by using the JS SDK file, and if yes, the login information is parsed out from the URL of the second page, the callback function is called, and the login information is sent to the callback function, so that the callback function calls the login information back into the application.

For example, when the game A displays the second page shown in FIG. 5, the login information is parsed out from the URL of the second page by using the JS SDK file, the callback function is called, and the login information is sent to the callback function, so that the callback function calls the login information back into the application. The callback function may call the login information, a login result, and the like back into the game A. The call-back content may be read and used by a developer, and facilitate development performed by the developer.

Optionally, the first sending unit includes: an interface module, configured to provide an API to the application, the API providing a channel for calling the JS SDK file to the application; and a first sending module, configured to send the first login path to the application through the channel.

The JS SDK file may provide an API getAvailableLoginType (option, callback), and the first login path in the JS SDK file may be sent to the application by using this interface. The application may jump to the first page associated with the first login path, to complete login. In this way, the plurality of login paths in the JS SDK file may be called by using a manner in which an interface is established between the application the JS SDK file, and the application performs calling by using an interface, and a calling manner of setting a plurality of interfaces and a plurality of interfaces is not needed, so that a calling program is simplified, a problem such as a calling error of a plurality of interfaces is avoided, and the system reliability is improved.

Optionally, the first sending unit includes: a search module, configured to search the plurality of login paths for a path matching the running environment; a determining module, configured to use the path matching the running environment as the first login path; and a second sending module, configured to send information about the first login path to the application.

The JS SDK file may determine a login path supported by a respective running environment, and therefore, one or more paths used in the detected running environment can be selected from the plurality of login paths according to the detected running environment. The matching process may use, for example, a form of a table, to record a correspondence between the running environment and the login path, and search, according to the correspondence, a login path that corresponds to a current running environment. Other matching manners may also be applied to this embodiment, and are not listed one by one herein.

Optionally, the first detection unit includes: a judging module, configured to determine whether an SDK file of a terminal on which the application runs provides any one or more of the plurality of login paths; and a call module, configured to: if it is determined that the SDK file of the terminal provides any one or more of the plurality of login paths, access, in a bridge mode, an API of the terminal to call the SDK file of the terminal, so that the any one or more login paths are sent to the application by using the SDK file of the terminal.

In an example, login paths are also stored in SDK files of one or more terminals. If a login path stored in an SDK file in a terminal may be called in the running environment of the application, login may be performed by directly using the login path in the SDK file in the terminal, and the JS SDK file works as a bridge, so that a procedure of the JS SDK file may be simplified, a logic is simplified by using the login path provided in the SDK file in the terminal, and the login efficiency is improved. In an example, if it is detected by using the JS SDK file that a terminal SDK supports QQ login and WeChat login, the JS SDK file may directly access, in a bridge mode, an API of the terminal, so that interaction between a service logic of the terminal and the application, and interaction between the terminal and a WeChat server or a QQ server are implemented.

The application in this embodiment may be a web application or another terminal application. The examples of QQ and WeChat that are used in this embodiment may be replaced with other social software, financial management software, game software, office software, and the like, and are not described one by one herein again.

Embodiment 3

Figure 9:
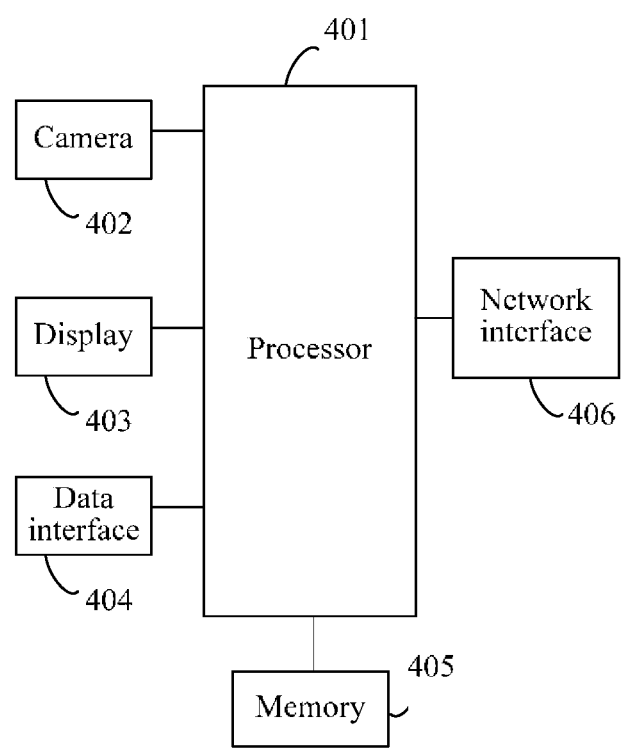
FIG. 9 is a schematic diagram of a terminal structure according to an embodiment of this application.

According to this embodiment of this application, a terminal used for implementing the foregoing account login method is further provided. As shown in FIG. 9, the terminal mainly includes a processor 401, a camera 402, a display 403, a data interface 404, a memory 405, and a network interface 406.

The camera 402 is mainly configured to collect images.

The data interface 404 is mainly configured to transmit, in a data transmission manner, data obtained by a third-party tool to the processor 401.

The memory 405 is mainly configured to store a program and data that are needed by running of an application.

The network interface 406 is mainly configured to perform network communication with a server, to obtain data of the application and login data.

The display 403 is mainly configured to display an interface of the application and a login interface.

The processor 401 is mainly configured to perform the following operations:

detecting, when an application is started, a running environment of the application by using a JS SDK file called by the application, a plurality of login paths for logging in to the application being encapsulated in the JS SDK file; detecting a login path supported by the running environment by using the JS SDK file; and sending a first login path to the application by using the JS SDK file, the first login path being the login path supported by the running environment, and the first login path being at least one of the plurality of login paths.

After sending the first login path to the application by using the JS SDK file, the processor 401 is further configured to perform the following operations: injecting, when the application jumps from a first page to a second page and loads the second page, a callback function to the second page by using the JS SDK file, the callback function being used for calling login information about a login using the first login path back into the application, the first page being a login page associated with the first login path, and the second page being a page to which the application returns after the login using the first login path.

Optionally, for a specific example in this embodiment, refer to the examples described in Embodiment 1 and Embodiment 2, and details are not described herein again in this embodiment.

Embodiment 4

An embodiment of this application further provides a storage medium. Optionally, in this embodiment, the foregoing storage medium may be configured to store program code of the account login method in this embodiment of this application.

Optionally, in this embodiment, the foregoing storage medium may be located in at least one of a plurality of network devices in a network of a mobile communications network, a wide area network, a metropolitan area network, or a local area network.

Optionally, in this embodiment, the storage medium is configured to store program code for performing the following steps:

In step S1, detecting, when an application is started, a running environment of the application by using a JS SDK file called by the application, a plurality of login paths for logging in to the application being encapsulated in the JS SDK file;

In step S2, detecting a login path supported by the running environment by using the JS SDK file; and In step S3, sending a first login path to the application by using the JS SDK file, the first login path being the login path supported by the running environment, and the first login path being at least one of the plurality of login paths.

Optionally, in this embodiment, the storage medium may include but is not limited to a medium that may store program code such as a USB flash drive, a read-only memory (ROM), a random access memory (RAM), a removable hard disk, a magnetic disk, or the like.

Optionally, for an example in this embodiment, refer to the examples described in Embodiment 1 and Embodiment 2, and details are not described herein again in this embodiment.

The sequence numbers of the preceding embodiments of this application are merely for description purpose but do not indicate a preference of the embodiments.

When the integrated unit in the foregoing embodiment is implemented in a form of a software functional unit and sold or used as an independent product, the integrated unit may be stored in the foregoing computer-readable storage medium. Based on such an understanding, the technical solutions of this application essentially, or the part contributing to the related technology, or all or some of the technical solutions may be implemented in a form of a software product. The computer software product is stored in a storage medium and includes several instructions for instructing one or more computer devices (which may be a PC, a server, or a network device) to perform all or some of the steps of the methods in the embodiments of this application.

In the foregoing embodiments of this application, descriptions of the embodiments have different emphases, and as for parts that are not described in detail in one embodiment, reference can be made to the relevant description of the other embodiments.

In the several embodiments provided in this application, it should be understood that the disclosed client may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The above descriptions are merely embodiments of this application, and it should be noted that, a person of ordinary skill in the art may make various improvements and refinements without departing from the spirit of this application.

All such modifications and refinements should also be intended to be covered by this application.

What is claimed is:

1. A method, comprising:
   calling a JavaScript (JS) Soft Development Kit (SDK) file by an application, a plurality of login paths for logging in to the application being encapsulated in the JS SDK file;
   detecting, when the application is started, a running environment of the application by using the JS SDK file;
   selecting one of the plurality of login paths as a first login path based on the running environment detected by using the JS SDK file; and
   sending the first login path to the application by using the JS SDK file, the first login path being a login path supported by the running environment.

2. The method according to claim 1, further comprising:
   when the application jumps from a first page to a second page and the second page is loaded, injecting a callback function to the second page by using the JS SDK file, the first page being a login page associated with the first login path, and the second page being a page associated with the application after login using the first login path, and the callback function being used to send login information associated with the login to the application.

3. The method according to claim 2, further comprising:
   obtaining a Uniform Resource Locator (URL) of the second page by using the JS SDK file;
   parsing out the login information in the URL of the second page; and
   sending the login information that is parsed out to the callback function by using the JS SDK file to enable the callback function to send the login information back to the application.

4. The method according to claim 1, wherein the sending the first login path to the application by using the JS SDK file comprises:
   providing an Application Programming Interface (API) to the application, the API providing a channel for calling the JS SDK file; and
   sending the first login path to the application by using the channel.

5. The method according to claim 1, wherein
   the selecting one of the plurality of login paths as the first login path comprises:
      determining, from the plurality of login paths, a login path compatible with the running environment, and
      setting the first login path to be the login path compatible with the running environment; and
   the sending the first login path to the application by using the JS SDK file comprises:
      sending information associated with the first login path to the application.

6. The method according to claim 5, wherein the determining, from the plurality of login paths, the login path compatible with the running environment comprises:
   determining, from the plurality of login paths, the login path compatible with the running environment by using a table that specifies a relationship between the running environment and the login path.

7. The method according to claim 1, further comprising:
   displaying, by the application, a login identifier associated with the first login path, the login identifier being used to receive a login indicator associated with the first login path and to connect to a first page after the login indicator is received, the first page being a login page associated with the first login path.

8. The method according to claim 1, wherein the detecting the running environment of the application by using the JS SDK file comprises:
   determining, by using the JS SDK file, whether an SDK file of a first apparatus provides one or more of the plurality of login paths, the first apparatus being where the application runs; and
   when the SDK file of the first apparatus provides the one or more of the plurality of login paths, accessing, via a bridge mode, an Application Programming Interface (API) of the first apparatus to call the SDK file of the first apparatus by using the JS SDK file, to enable the SDK file of the first apparatus to send the one or more of the plurality of login paths to the application.

9. An information processing apparatus, comprising:
   processing circuitry configured to:
   call a JavaScript (JS) Software Development Kit (SDK) file by an application, a plurality of login paths for logging in to the application being encapsulated in the JS SDK file;
   detect, when the application is started, a running environment of the application by using the JS SDK file;
   select one of the plurality of login paths as a first login path based on the running environment detected by using the JS SDK file; and
   send the first login path to the application by using the JS SDK file, the first login path being a login path supported by the running environment.

10. The information processing apparatus according to claim 9, wherein the processing circuitry is further configured to:
    inject, when the application jumps from a first page to a second page and the second page is loaded, a callback function to the second page, the first page being a login page associated with the first login path, and the second page being a page associated with the application after login using the first login path, and the callback function being used to send login information associated with the login to the application.

11. The information processing apparatus according to claim 10, wherein the processing circuitry is further configured to:
    obtain a Uniform Resource Locator (URL) of the second page by using the JS SDK file;
    parse out the login information in the URL of the second page; and
    send the login information that is parsed out to the callback function by using the JS SDK file to enable the callback function to send the login information back to the application.

12. The information processing apparatus according to claim 9, wherein the processing circuitry is further configured to:
    provide an Application Programming Interface (API) to the application, the API providing a channel for calling the JS SDK file; and
    send the first login path to the application by using the channel.

13. The information processing apparatus according to claim 9, wherein the processing circuitry is further configured to:
    determine, from the plurality of login paths, a login path compatible with the running environment;
    set the first login path to be the login path compatible with the running environment; and send information associated with the first login path to the application.

14. The information processing apparatus according to claim 13, wherein the processing circuitry is further configured to:
    determine, from the plurality of login paths, the login path compatible with the running environment by using a table that specifies a relationship between the running environment and the login path.

15. The information processing apparatus according to claim 9, wherein the processing circuitry is further configured to:
    display, by the application, a login identifier associated with the first login path, the login identifier being used to receive a login indicator associated with the first login path and to connect to a first page after the login indicator is received, the first page being a login page associated with the first login path.

16. The information processing apparatus according to claim 9, wherein the processing circuitry is further configured to:
    determine, by using the JS SDK file, whether an SDK file of a first apparatus provides one or more of the plurality of login paths, the first apparatus being where the application runs; and
    when the SDK file of the first apparatus provides the one or more of the plurality of login paths, access, via a bridge mode, an Application Programming Interface (API) of the first apparatus to call the SDK file of the first apparatus by using the JS SDK file, to enable the SDK file of the first apparatus to send the one or more of the plurality of login paths to the application.

17. A non-transitory computer-readable medium storing a program executable by a processor to perform:
    calling a JavaScript (JS) Software Development Kit (SDK) file by an application, a plurality of login paths for logging in to the application being encapsulated in the JS SDK file;
    detecting, when the application is started, a running environment of the application by using the JS SDK file;
    selecting one of the plurality of login paths as a first login path based on the running environment detected by using the JS SDK file; and
    sending the first login path to the application by using the JS SDK file, the first login path being a login path supported by the running environment.

* * * * *